United States Patent [19]

Myreen

[11] 4,200,600
[45] Apr. 29, 1980

[54] APPARATUS FOR HEATING A LIQUID SUSPENSION BY ANOTHER LIQUID SUSPENSION

[75] Inventor: Bertel Myréen, Turku, Finland
[73] Assignee: RA-Shipping Ltd. OY, Pargas, Finland
[21] Appl. No.: 837,703
[22] Filed: Sep. 27, 1977
[30] Foreign Application Priority Data
  Sep. 28, 1976 [FI] Finland .............................. 2759/76
[51] Int. Cl.² .......................... B01D 1/26; F28B 1/00; B01F 3/04
[52] U.S. Cl. .......................... 261/147; 165/DIG. 16; 159/176; 159/18; 202/158; 202/173
[58] Field of Search ...................... 203/100, 99, 90, 73, 203/1, 91; 202/234, 236, 181, 173, 174, 158, 185 A; 165/110, 111, 112, DIG. 16; 159/18, 17 C, DIG. 8; 261/147

[56] References Cited
U.S. PATENT DOCUMENTS

| | | | |
|---|---|---|---|
| 92,941 | 7/1869 | Dean | 165/110 |
| 385,504 | 7/1888 | Colwell | 165/112 |
| 1,924,312 | 8/1933 | Frischer | 203/35 |
| 2,749,094 | 6/1956 | Lewis et al. | 202/158 |
| 3,306,346 | 2/1967 | Othmer | 165/110 |
| 4,089,752 | 5/1978 | Hancock | 203/99 |

Primary Examiner—Wilbur L. Bascomb, Jr.
Attorney, Agent, or Firm—Browdy and Neimark

[57] ABSTRACT

The invention relates to an apparatus for heat exchange between two liquids without solid matters contained in the liquids. The apparatus comprises a pressure vessel which is divided into a plurality of compartments, each compartment comprising an inner space having an open end and an outer annular space. A baffle having a closed upper end is provided around the upper portion of each inner space with an annular slit between the baffle and the wall of the inner space. The baffle extends to a level below the upper end of the inner space. Injection nozzles for the heat-receiving liquid are provided in the upper portion of the outer space of each compartment, and an outlet pipe is connected to the lower end of the outer space. Inlet and outlet pipes for the heat-delivering liquid are connected to the upper and lower ends respectively of the inner space. The inner and outer spaces respectively are connected in series, and the heat-delivering and heat-receiving liquids are fed in countercurrent with respect to each other. The heat-delivering liquid generates vapor that passes downwards through the annular slit between the inner space and the baffle and then upwards to meet droplets of the heat-receiving liquid from the nozzles.

6 Claims, 5 Drawing Figures

APPARATUS FOR HEATING A LIQUID SUSPENSION BY ANOTHER LIQUID SUSPENSION

BACKGROUND OF THE INVENTION

1. Field of the Invention

The present invention concerns an apparatus serving to heat a first liquid suspension by means of a second liquid suspension without incurring intermixing of the solids in the two suspension flows, said apparatus consisting of a plurality of series connected units, each of which comprises a pressure chamber, a container closed at its bottom and open at the top disposed within the pressure chamber and provided at the top with a supply conduit for said second heat-releasing liquid suspension and at the bottom with a drain conduit for cooled second liquid suspension, the free space between the wall of the pressure chamber and the inner container being provided at the top with at least two nozzles for the introduction of a jet of said first heat-receiving liquid suspension and at the bottom with a draining pipe line for heated first liquid suspension, and the draining pipe line for the cooled heat-releasing liquid suspension being connected by means of a connecting pipe to the supply pipe line of a preceding unit, and the draining pipe line for heated heat-receiving liquid suspension connected by means of a connecting pipe with incorporated pump, with the nozzles of a subsequent unit.

2. Description of the Prior Art

The invention specifically concerns an arrangement functioning under such pressure and temperature conditions that boiling can take place in said second heat releasing liquid, which shall henceforth be referred to as liquid A, and that condensation of vapor can take place in said heat-receiving liquid, which shall henceforth be referred to as liquid B.

Thus, the object of the invention is to provide an apparatus the operation of which is based on the fact, well-known in itself, that if a liquid is introduced into a space where a temperature prevails which is lower than the vapor pressure consistent with the liquid's temperature, expansion vapor will depart from the liquid which is at the same time cooled to a temperature corresponding to the vapor pressure. The heating in the apparatus is based on the, likewise well-known, phenomenon that if vapor and liquid are mixed in a space where the vapor pressure is higher than the vapor pressure consistent with the temperature of the liquid, vapor will condense onto the surface of the liquid, while the liquid is heated. Since the solid and liquid phases can be effeciently separated from the vapor phase by well-known methods, the vapor departing from liquid A and condensing on liquid B will not transport any solid matter from liquid A to liquid B.

Exchange of heat between two liquids, whereat one of these is heated and the other is cooled, is usually effected in heat exchangers wherein both liquids are caused to flow past a heat-transmission partition separating them. As a result of temperature differences, a heat flow is transmitted through the partition, which also prevents the mixing of the liquids. In applications involving heat exchange between different suspensions such heat exchanges are often altogether inappropriate owing to the fact that the flow passages in the pieces of equipment are blocked by solid material in suspension and that the heat transmission wall soon acquires a coating impeding the flow of heat. In the invention presented here, these problems are avoided.

In a report of the year 1960 by A. B. Svensk Torvförädling, a condenser with built-in cyclone is disclosed. The apparatus consists of a cylindrical pressure vessel standing in vertical position and having a nozzle at the top for injection of the heat-receiving suspension, and an intermiediate bottom with drain for heated suspension. Piercing the intermiediate bottom, a vertical cylinder is centrally disposed, with an upper tangential input for the heat releasing suspension and with a drain for the cooled suspension on the bottom of the pressure vessel. In order to prevent the downwardly falling drops of heat receiving suspension from becoming mixed with the heat releasing suspension, the vertical cylinder is provided at the top with a screen protecting its mouth aperture from the falling drops and directing the vapors which rise out of the cylinder, to one side so that they are met sidewise by the falling drops.

SUMMARY OF THE INVENTION

An apparatus of this kind is, however, encumbered by considerable drawbacks, and the object of the present invention is now to provide an apparatus wherein these drawbacks have been eliminated.

The main characteristic features of the apparatus of the present invention are readable from the attached claim 1.

The apparatus of the invention differs from the above-mentioned cyclone condenser, i.a., in that several units are built in into one pressure vessel, whereby the costs both of the pressure vessels and of their supporting structures are substantially reduced, the cyclone part is completely enclosed within the pressure vessel and has no part in common with the pressure vessel wall, the expansion vapor is carried down into the condenser part so that countercurrent flow is accomplished in this part, a plurality of nozzles is employed for distributing the suspension in the condenser part, whereby better utilization of its volume is achieved.

Vapor obtained by the boiling of process flows, such as the liquid flow A, frequently also contains other gases, which do not condense at an equally high temperature as the vapor. These so-called non-condensing gases in the vapor may substantially reduce the vapor flow which one can make to condense e.g. upon drops of the liquid flow B. Continuous degassing of the vapor space is therefore necessary in view of maintaining a good heating capacity.

According to a preferred embodiment of the present invention, these non-condensing gases are removed from the free volume between the inner vessels and the wall of the pressure chamber from a level which is above the point of injection of the heat-receiving suspension.

BRIEF DESCRIPTION OF THE DRAWING

The invention is described more closely in the following with reference to the attached drawings wherein.

DESCRIPTION OF THE PREFERRED EMBODIMENTS

Figure 1:
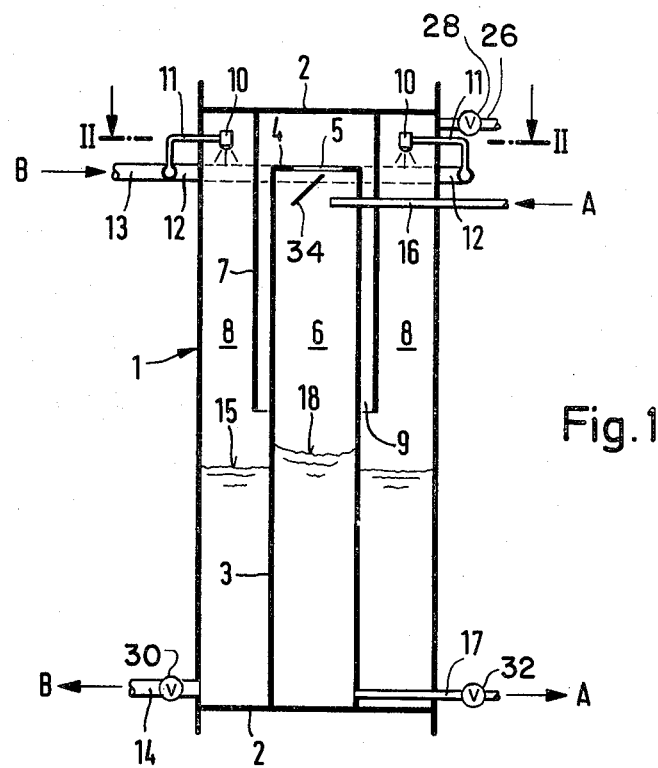
FIG. 1 illustrates a schematical cross section of a unit of an apparatus according to the present invention.

It is an essential feature of the present invention that the preheater tower consists of two or more units of identical function, disposed above and potentially beside each other within a vertically upright cylindrical pressure vessel having conventionally shaped ends. The walls of the pressure vessel constitute parts of these units. The construction and function of each such unit is described with the aid of FIG. 1, which shows the unit schematically, viewed from one side, and of FIG. 2, which schematically shows the unit in top view.

In these figures, 1 is the pressure vessel shell, and 2 are those partitions which separate the units lying one upon the other. In the outermost units of the preheater tower these partitions are replaced by the ends of the pressure vessel. In each unit there is, e.g. concentrically disposed, a cylindrical plate 3, which is tightly affixed to the lower partition 2 and which may at the top be terminated with a reinforcing ring 4, which is no larger than to leave open a flow passage 5, leading out from the cylindrically shaped volume 6 thus established. This plate may also have a shape other than that of a cylinder. Outside the shell plate 3 there is another cylindrically shaped plate 7. This plate is terminated on top by a closed cover. This cover may consist of the upper partition 2, as has been indicated in FIG. 1. Thus, liquid or vapor may not flow the upper way around the plate 7 between the space 6 and the space 8 defined between the plates 1 and 7. The plate 7 has a length such that its lower edge lies at a height lower than that of the upper edge of plate 3, whereby between these plates an annular flow passage 9 is defined, which is the sole communication between spaces 6 and 8.

Figure 2:
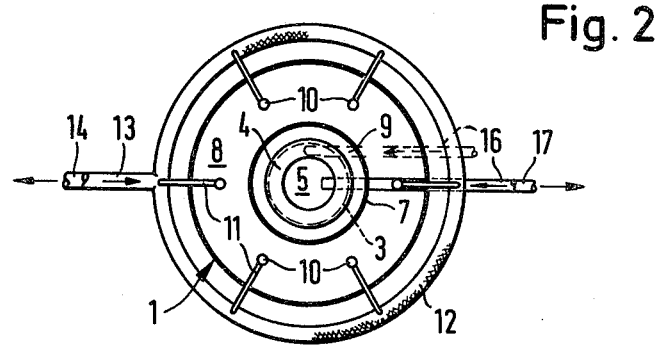
FIG. 2 shows the same detail as FIG. 1, seen from above.

In the upper part of the space 8 a number of nozzles 10 have been placed. In FIG. 2, six such nozzles have been depicted, but they may equally be more or less numerous, though not less than two. Through these nozzles the heat receiving liquid B is distributed in the space 8. The liquid is carried to the nozzles through pipe lines 11 from a distributing line 12, this line in its turn being connected to a supply line 13. The liquid B is withdrawn from the lower part of the space 8 through a pipe line 14 in such manner that there is a free liquid surface 15 of liquid B in the space 8 at a level lower than the height of the discharges of the nozzles 10. It is thus understood that above the surface 15 there is a part of the space 8 which is mainly filled with vapor.

The heat-releasing liquid A, which also contains a certain amount of vapor, flows to the space 6 through a pipe line 16 and it is withdrawn through the pipe line 17, so that a free liquid surface 18 of liquid A is established in the space 6 under the flow-out aperture 5. It is thus understood that above the surface 18 there is a part of the space 6 which is mainly filled with vapor that is produced through the boiling of liquid A. The pipe line 16 may be so disposed that the liquid A is deflected against the plate 3, so that a vapor/liquid separation by cyclone action is obtained in the space 6, as shown in phantom lines in FIG. 2. Alternatively, one may in front of the discharge of the pipe line 16 place a suitably shaped plate 34 (shown in FIG. 1 but not in FIG. 2), which collects and deflects the discharging liquid downwardly, while the vapor may depart upwardly around this plate.

The regulation of the liquid levels 15 and 18 to desired heights may be accomplished with the aid of valves 30, 32 or other restricting members in the drain lines 14 and 17, respectively, in a commonly known manner.

The unit operates in continuous steady state as follows. Liquid A flows to the unit through pipe line 16 and having a temperature which is higher than the boiling temperature consistent with the pressure prevailing in the unit. In the pipe line 16 and in the space 6, the liquid will therefore give off expansion vapor, while at the same time its temperature goes down. The liquid thus cooled collects in the lower part of the volume 6 and is taken out through the pipe line 17. The expansion vapor, which is freed of solid and liquid phase by cyclone effect or by deflection, departs through the aperture 5 and through the annular gap 9 to the space 8, in which a flow of liquid B is introduced through the nozzles 10, this liquid having a temperature lower than the condensing temperature of the expansion vapor. The vapor will then condense on the surface of liquid B, which surface it is possible to increase powerfully by dispersing the liquid into fine droplets with the aid of the nozzles 10. At the vapor condensation the liquid B is heated, whereupon it collects in the lower part of space 8 and is allowed to flow out through the pipe line 14. It is thus understood that by partial evaporation of the liquid flow A and condensation of this vapor in the liquid flow B, cooling of liquid A is obtained with simultaneous heating of liquid B.

The annular gap 9 has such width that no substantial pressure drop arises in the gap as the vapor flows therethrough. The vapor pressure is then virtually the same both in space 6 and in space 8. The plate 7 prevents the penetration of liquid B into the space 6. At the same time the plate 7 guides the vapor down into the lower part of the vapor space 8, so that the vapor in this vapor space mainly flows upwardly as a countercurrent to liquid B. In case the vapor contains noncondensing gases, these will be displaced by the vapor up to the topmost part of 8, where they are enriched and can be taken out through pipe lines 26 fitted with throttling members 28.

Figure 3:
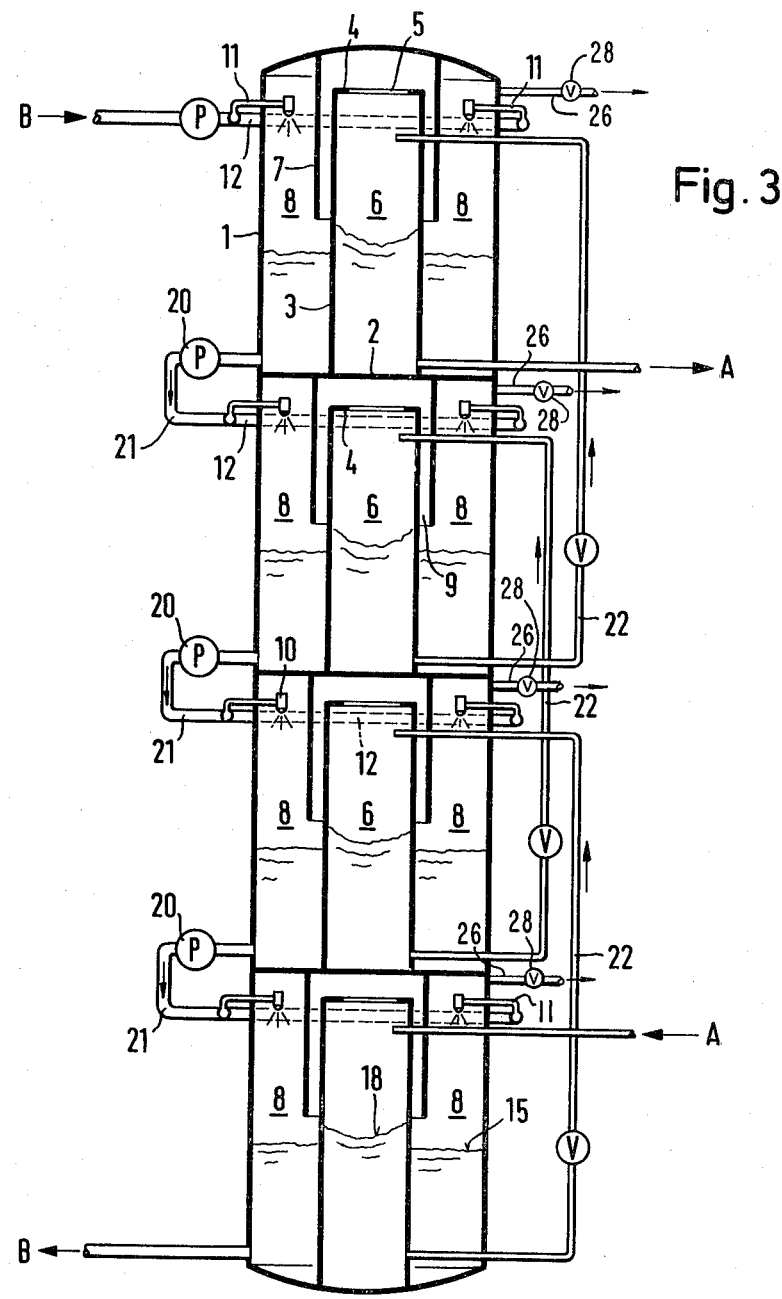
FIGS. 3–5 present schematic elevational view of various embodiments of the present invention.
Figure 4:
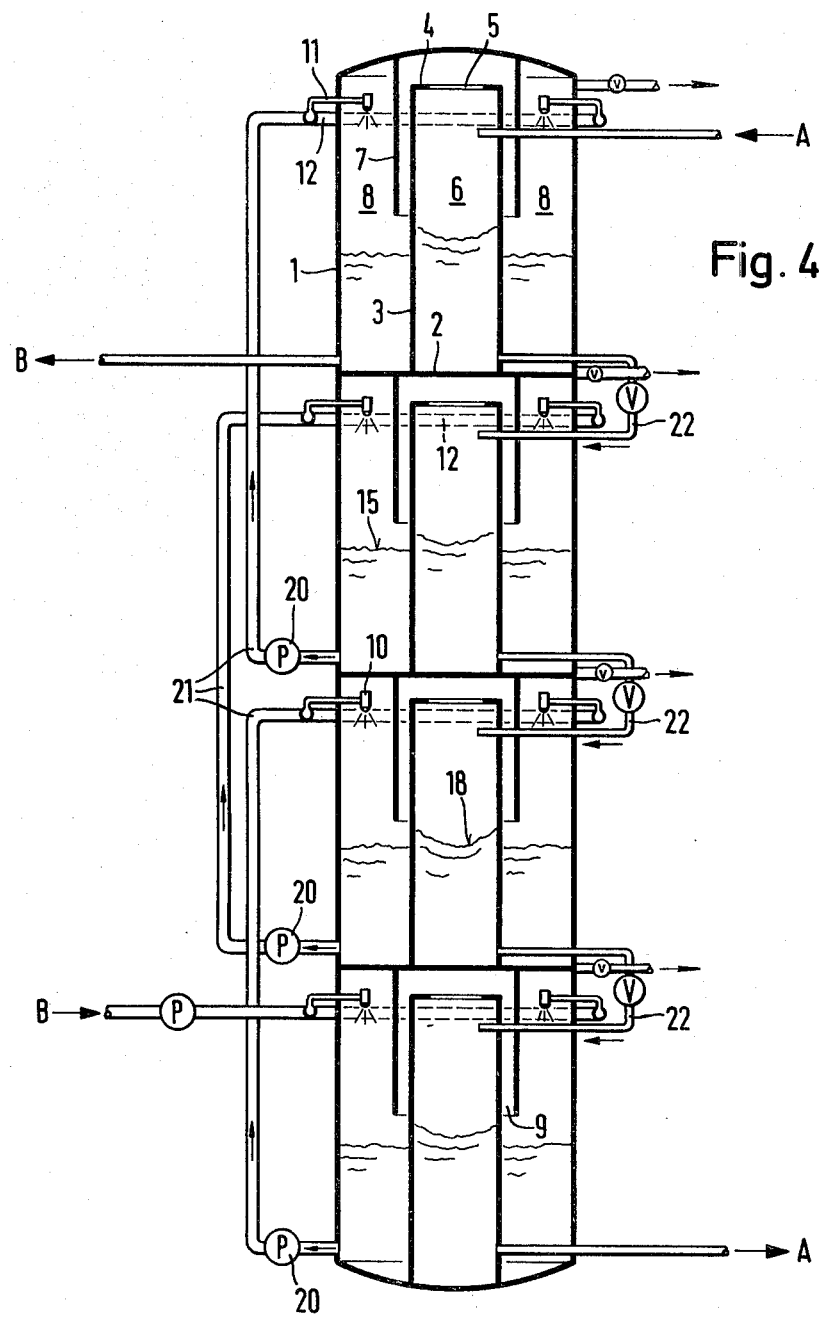

In addition to the embodiment of these units, it is a characteristic feature of the preheating tower that several such units have been connected in series in countercurrent fashion within one pressure vessel. One achieves hereby a reduction of the apparatus envelope that has to be made of heavy pressure vessel plate so that it is able to withstand high diffenrential pressures. In FIG. 3 the placement of the units is schematically shown, as well as their connection in a preheater tower of four units, where liquid A is supplied to the lowermost unit. Alternatively, liquid A may be supplied to the topmost unit, as shown in FIG. 4. In FIGS. 3 and 4, numeral 20 indicates pumps by which liquid B is transported through pipe lines 21 between the different units in the preheater tower. In the same figures, 22 indicates pipe lines through which liquid A flows between units. The pipe lines 21 connect the liquid drain 14 with the liquid input 13 in an adjacent unit, and the pipe lines 22 connect the liquid drain 17 with the liquid input 16 in an adjacent unit.

Figure 5:
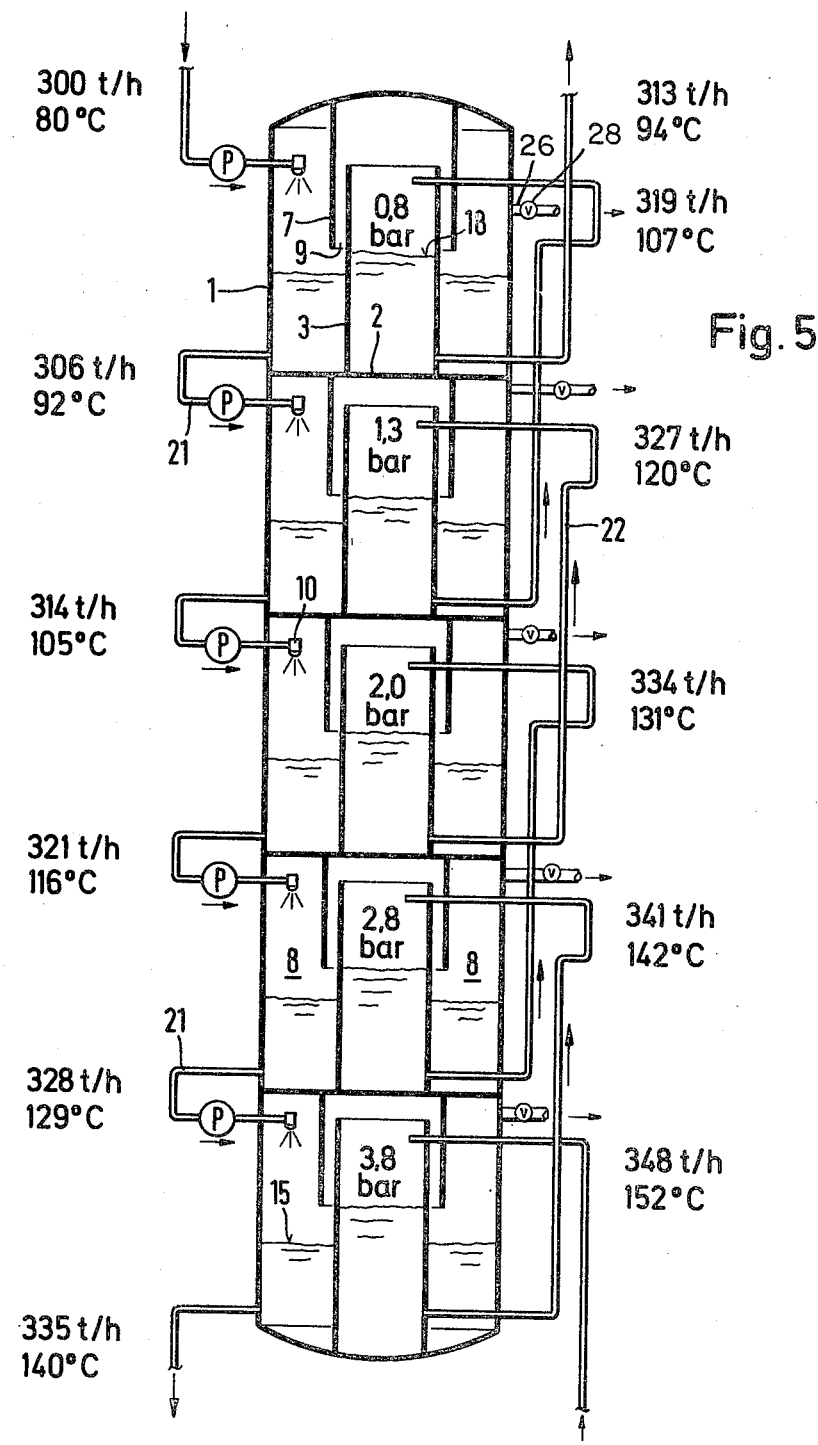

When the tower is being used, there is supplied to it a flow of the heat-releasing suspension A and likewise a flow of the heat-receiving suspension B. The temperature of the entering flow A is higher than that of the entering flow B. In continuous operation an equilibrium is obtained in the preheater tower, which determines the pressures in the various units and the temperatures of the various suspension flows in the apparatus. The equilibrium state depends in the first place on the proportion of the mass flow rates of supplied A and B suspension, on the temperatures at entrance of these suspensions, and on how intense is the heat transfer at vapor condensation in the various units. In order to illustrate which flow rates, pressures and temperatures may come into question, FIG. 5 gives data calculated for a preheater tower with five units connected in series in countercurrent, and in which tower 300 tons per hour of an aqueous suspension having the temperature at entrance 80° C. are heated to 140° C. by means of 348 tons per hour of a suspension having the temperature at entrance 152° C., and which suspension is simultaneously cooled down to 94° C. In the figure the pressure prevailing in each individual unit has been entered.

What is claimed is:

1. An apparatus for heating a first liquid by a second liquid without intermixing solid matters contained in said liquids, comprising a pressure vessel, partitions in said vessel dividing it into a plurality of pressure compartments, a container having a closed lower end and an open upper end disposed within each of said compartments with a free space surrounding said container, a baffle member having a closed upper end extending around each of said containers at a distance therefrom within said free space, said baffle member having a lower edge terminating at a lower level than said open upper end of said container, an inlet pipe and an outlet pipe respectively for said second liquid connected to each of said containers at the upper and lower portions thereof respectively, a plurality of injection nozzles for said first liquid disposed in the upper portion of each of said free spaces outside of said baffle members, and an outlet pipe for said first liquid connected to the lower portion of each of said free spaces, said free spaces and said containers in said compartments being connected in series such that said outlet pipe for said second liquid of one container is connected to said inlet pipe for said second liquid of the container in the adjacent compartment, and said outlet pipe for said first liquid of one of said free spaces being connected to said injection nozzles in said free space of the adjacent compartment, and means for supplying said first and second liquids to said injection nozzles and inlet pipes respectively in countercurrent flow with respect to each other.

2. An apparatus as in claim 1, further including outlet means for removal of non-condensing gases being connected to each of said compartments at a level above said injection nozzles.

3. An apparatus as in claim 1, further including means for control of the liquid levels within said container and said free space respectively of each of said compartments, said control means being provided in said outlet pipes for said first and second liquids respectively.

4. An apparatus as in claim 1, wherein said injection nozzles comprise nozzles for dispersing liquid into fine droplets.

5. An apparatus as in claim 1, wherein said inlet pipe for said second liquid of each of said containers extends tangentially with respect to the wall of said container.

6. An apparatus as in claim 1, further including a deflection member disposed in each of said containers in front of said inlet pipe for said second liquid.

* * * * *